United States Patent [19]
Thompson

[11] 3,718,453
[45] Feb. 27, 1973

[54] PRODUCTION OF POTASSIUM DIHYDROGEN PHOSPHATE FERTILIZERS
[75] Inventor: William H. Thompson, Dublin 14, Ireland
[73] Assignee: W. & H. M. Goulding Limited, Dublin, Ireland
[22] Filed: Sept. 19, 1969
[21] Appl. No.: 859,435

[30] Foreign Application Priority Data

Sept. 20, 1968 Great Britain......................44,789/68
June 6, 1969 Great Britain......................28,659/69

[52] U.S. Cl. ..............................71/34, 23/107, 71/37
[51] Int. Cl. ..........................C05b 7/00, C01b 25/28
[58] Field of Search ....71/34, 37, 40, 41, 39; 23/107, 23/165, 165 C, 312 P, 90, 109

[56] References Cited

UNITED STATES PATENTS

| | | | |
|---|---|---|---|
| 3,600,152 | 8/1971 | Drechsel et al. | 71/34 |
| 1,916,431 | 7/1933 | Larsson | 23/165 |
| 2,894,813 | 7/1959 | Beniel et al. | 23/107 X |
| 3,033,669 | 5/1962 | Strauchen et al. | 23/109 X |
| 3,511,602 | 5/1970 | Fitch et al. | 23/165 X |
| 3,455,649 | 7/1969 | Bigot | 23/107 |
| 3,246,977 | 4/1966 | Hinkle | 71/40 X |
| 2,531,977 | 11/1950 | Hammaren et al. | 23/165 X |
| 3,326,667 | 6/1967 | Rooij | 71/43 X |
| 3,446,583 | 5/1969 | Rooij et al. | 71/43 X |
| 1,929,442 | 10/1933 | Milligan | 23/107 X |

FOREIGN PATENTS OR APPLICATIONS

| | | | |
|---|---|---|---|
| 810,208 | 3/1959 | Great Britain | 71/34 |
| 1,131,241 | 6/1962 | Germany | 71/37 |

*Primary Examiner*—Samih N. Zaharna
*Assistant Examiner*—Richard Barnes
*Attorney*—Kenyon & Kenyon Reilly Carr & Chapin

[57] ABSTRACT

The invention relates to the production of fertilizers, in particular potassium dihydrogen phosphate. This is obtained through acid attack on phosphate rock by a medium obtained by the reaction of sulphuric acid with potassium chloride. In particular, the phosphate rock is reacted with a medium comprising potassium bisulphate, sulphuric acid and phosphoric acid. As a result, the solid calcium sulphate formed in the reaction mixture can be readily filtered off from the mother liquor and the potassium dihydrogen phosphate product can be recovered in a commercially operative process. The mother liquor containing phosphoric acid and potassium dihydrogen phosphate is recycled to the original reaction mixture.

11 Claims, 4 Drawing Figures

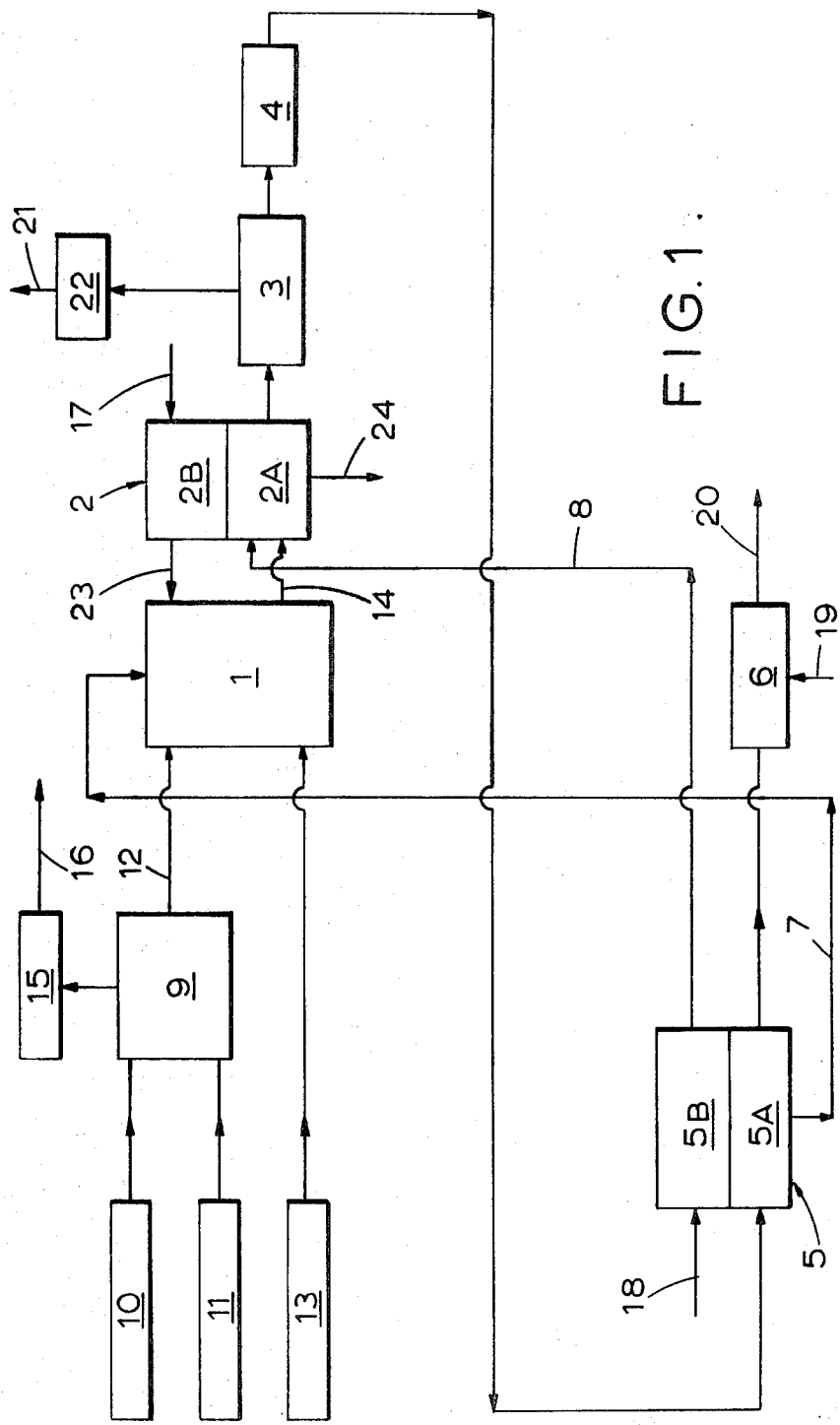

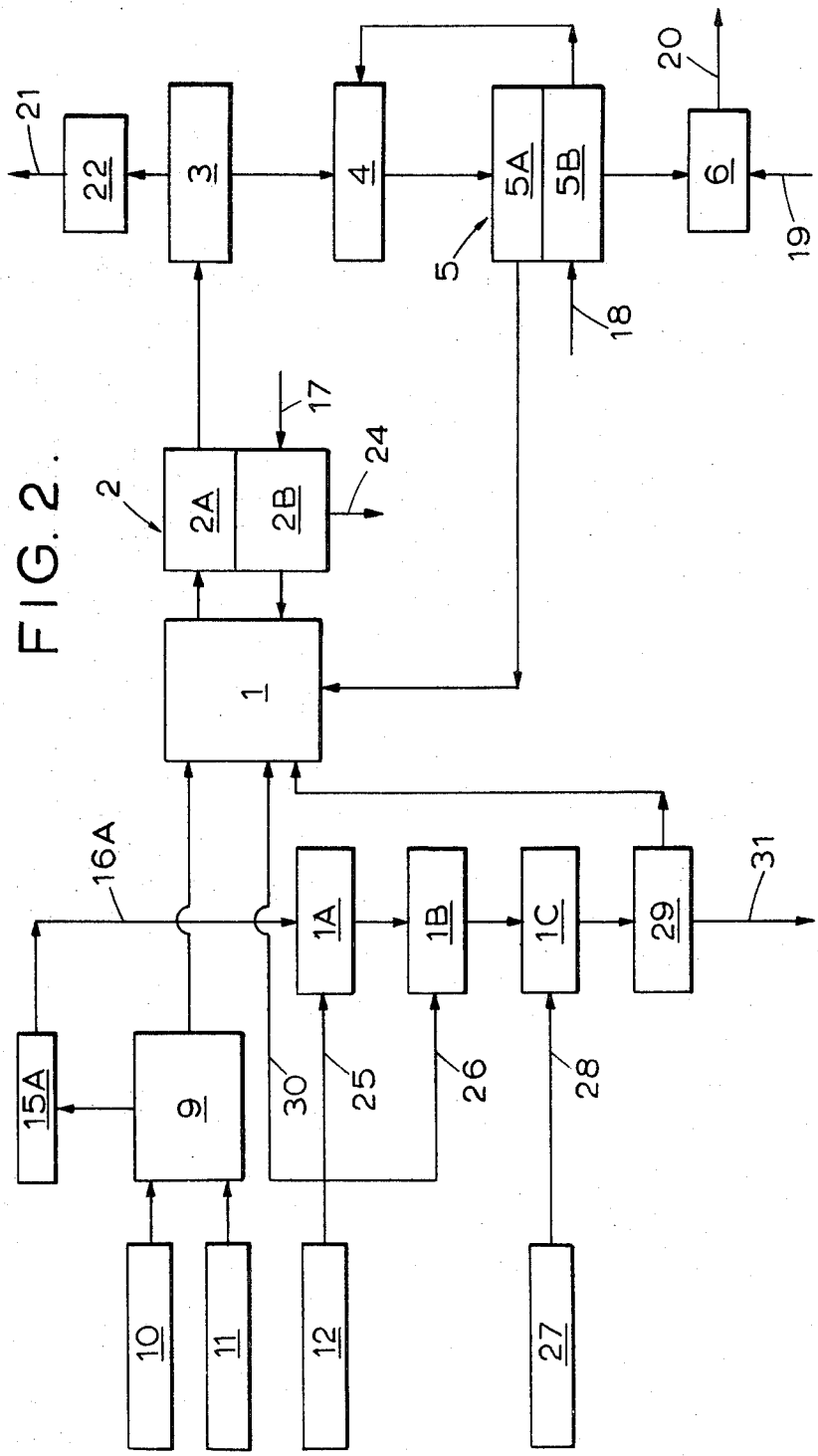

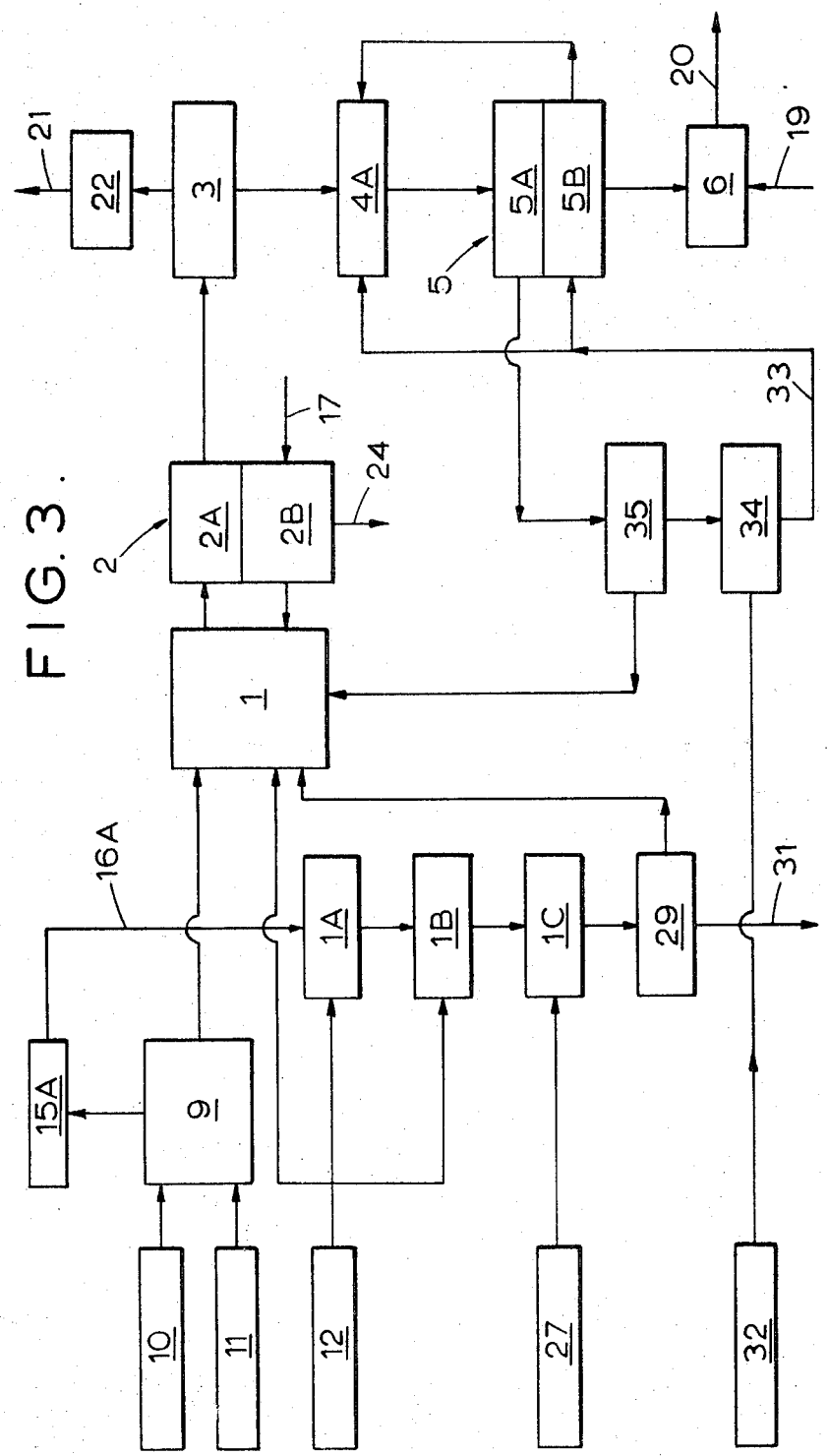

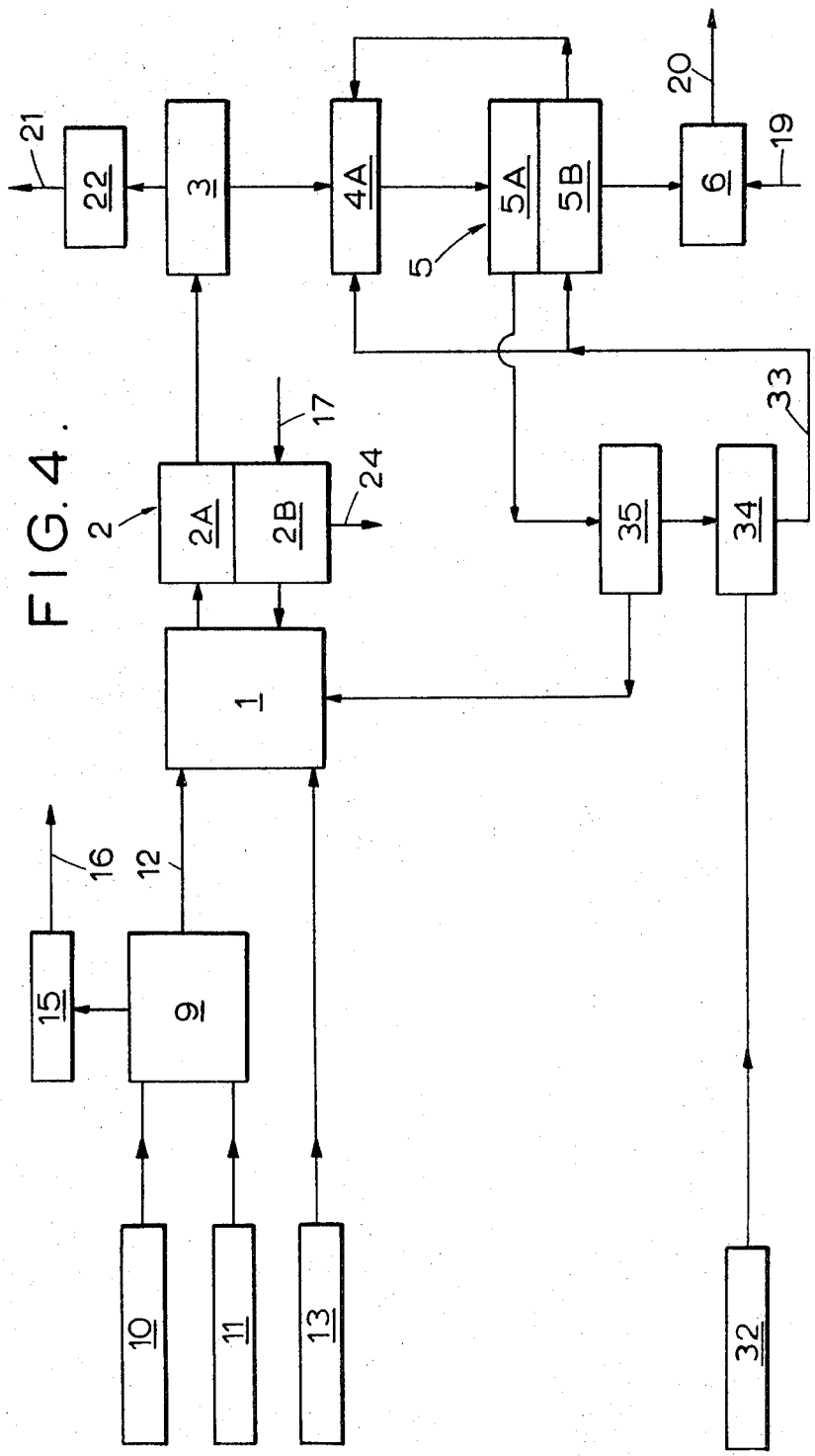

PRODUCTION OF POTASSIUM DIHYDROGEN PHOSPHATE FERTILIZERS

This invention relates to the production of fertilizers and is particularly concerned with the production of potassium dihydrogen phosphate which is particularly valuable in presenting both potassium and phosphorus in a convenient solid form which can be used either as a fertilizer directly or in combination with other components.

We propose to obtain potassium dihydrogen phosphate through acid attack on phosphate rock. The attacking medium may be formed through the reaction of sulphuric acid on potassium chloride.

Accordingly, in this invention, we provide a process for the production of potassium dihydrogen phosphate in which phosphate rock is reacted with a medium comprising potassium bisulphate, sulphuric acid and phosphoric acid.

As a result, the solid calcium sulphate as dihydrate, semi hydrate or anhydrite formed in the reaction mixture can be readily filtered off from the mother liquor, and the potassium dihydrogen phosphate product can be recovered in a commercially operative process.

The mother liquor containing phosphoric acid and potassium dihydrogen phosphate is recycled to the original reaction mixture.

Alternatively, phosphate rock is reacted with aqueous hydrochloric acid to produce a reaction mixture comprising phosphoric acid, calcium phosphate and calcium chloride. This is reacted with further quantities of phosphate rock to precipitate dicalcium phosphate and limestone, lime or other alkaline material is added to produce a slurry comprising the insoluble dicalcium phosphate and unreacted phosphate rock in suspension in a solution of calcium chloride. The solids are separated and washed free from chloride. These reactions may be illustrated as follows:

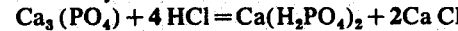
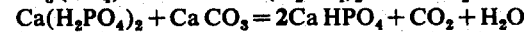

$Ca_3(PO_4) + 4 HCl = Ca(H_2PO_4)_2 + 2CaCl_2$
$Ca(H_2PO_4)_2 + CaCO_3 = 2CaHPO_4 + CO_2 + H_2O$

The resulting solids are reacted with a medium comprising potassium bisulphate and sulphuric acid, obtained by reaction of sulphuric acid on potassium chloride, and recycled phosphoric acid. The crystalline calcium sulphate produced can be filtered off from the mother liquor and the potassium dihydrogen phosphate product can be recovered from the mother liquor. Hydrochloric acid formed by the above reaction of sulphuric acid on potassium chloride may be used for the initial attack on the phosphate rock. The use of hydrochloric acid in this way contributes to the economics of the process.

In order to obtain calcium sulphate in a filterable form, high acid concentrations are necessary in the reaction slurry. This acid manifests itself in the crystallizing liquor and, under the conditions necessary for good yields, and addition product of potassium phosphate with phosphoric acid is formed $KH_2PO_4 \cdot H_3PO_4$. This material crystallizes from solution. It is found, that, if a water-miscible organic liquid such as methanol, ethanol, isopropanol or acetone is added to the liquor, potassium phosphate of good analysis is obtained in a good yield. The associated phosphoric acid remains in solution. The organic liquid is recovered in a still and returned to the process. Virtually all the impurities present in the solution, chiefly fluorine compounds, are precipitated with the product and the residual solution of phosphoric acid and potassium phosphate, after removal of the organic liquid is of high purity and can be used in the manufacture of other phosphates or returned to the process.

The attacking medium may be formed through the reaction of sulphuric acid on potassium chloride.

In the reaction between sulphuric acid and potassium chloride it has been found that the removal of the hydrochloric acid is a relatively easy matter if the reaction is carried out in the amounts required for the overall reaction but this is not so easily achieved if stoichiometric quantities are used. Thus, it is a feature of this embodiment of the invention to use excess acid which is subsequently reacted with phosphate rock. The second reaction between the phosphate rock and the acid slurry has been shown to proceed quantitatively and impure potassium phosphate has been isolated in yields up to 95 percent. These reactions may be illustrated as follows:

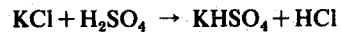
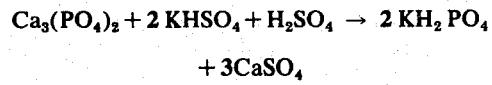

$KCl + H_2SO_4 \rightarrow KHSO_4 + HCl$ $Ca_3(PO_4)_2 + 2 KHSO_4 + H_2SO_4 \rightarrow 2 KH_2PO_4 + 3CaSO_4$ The hydrochloric acid produced as a by-product is a saleable commodity but may be converted to other desired materials or used for phosphoric acid production or dicalcium phosphate production or used intrinsically in the process as described.

Instead of forming the attacking medium by the reaction of sulphuric acid on potassium chloride, we may use potassium sulphate together with excess sulphuric acid but we prefer to use the reaction on potassium chloride since this is a readily available and economic starting material.

Formulations based on the potassium dihydrogen phosphate product of the process of the invention are as follows:

Example 1

Product analysis 36% $P_2O_5$ 36% $K_2O$

| | |
|---|---|
| Potassium phosphate | 78.6% |
| Potassium chloride (60% $K_2O$) | 21.4% |

Example 2

Product analysis 20% N 20% $P_2O_5$ 20% $K_2O$

| | |
|---|---|
| Urea | 44.5% |
| Potassium phosphate | 43.7% |
| Potassium chloride (60% $K_2O$) | 11.8% |

Example 3

A chloride free compound of analysis 27% N 13.5% $P_2O_5$ 13.5% $K_2O$.

| | |
|---|---|
| Urea | 60.0% |
| Potassium phosphate | 29.5% |
| Potassium sulphate (50% $K_2O$) | 10.5% |

These materials may be made as granulates or may be prilled.

For a better understanding of the invention flow sheets four embodiments of the process according to the invention are shown on the accompanying drawings.

Flow sheet 1 relates to the treatment of the phosphate rock with a medium comprising sulphuric acid and phosphoric acids and potassium bisulphate produced from potassium chloride by sulphuric acid attack.

The apparatus comprises a reactor 1 for the phosphate rock attack followed by a calcium sulphate filter 2, an evaporator 3, a crystallizer 4, a separator and washer 5 and a dryer 6. Conduits 7 recycling mother liquor from the separator 5A to the reactor 1 and conduits 8 recycled from the washer 5B to the lower half 2A of the filter.

If hydrochloric acid is used intrinsically in the process and precipitation of the product is achieved by means of a water-suluble organic liquid, the apparatus comprises: reaction vessels for the rock attack, a filter for separating the reprecipitated phosphate, a reactor for the sulphate reaction with phosphate, a gypsum filter, an evaporator, a precipitator, a separator and washer, and a dryer and distillation column for the recovery of the organic liquid.

A sulphate converter 9 with a potassium chloride feeder 10 and a sulphuric acid feeder 11 is provided to supply at 12 potassium bisulphate and sulphuric acid to the reactor. Phosphate rock is fed directly to the reactor from a feeder 13.

The apparatus may be operated as follows:

Phosphate rock is digested in the reactor 1 by the acid medium comprising potassium bisulphate and sulphuric acid from the converter 9 and recycled mother liquor containing phosphoric acid from the separator 5A. The reactor product is fed at 14 to the filter section. 2A as a suspension of crystalline calcium sulphate in a dilute solution of potassium dihydrogen phosphate in phosphoric acid. The calcium sulphate crystals are separated off at 24 in the section 2A and the liquid medium is concentrated in the evaporator 3 to approximately 40 percent weight potassium dihydrogen phosphate. Potassium dihydrogen phosphate crystals are then formed in the crystallizer 4 and the resulting suspension is fed to the separator and washer 5A, 5B. The product crystals are finally dried at 6 and form a product 20.

The gaseous hydrogen chloride from the converter is fed to a scrubber 15 in which it is absorbed to form a hydrochloric acid solution which is a by-product 16 of the process. Water is fed to the filter wash section 2B at 17 and to the washer 5B at 18. Heat is supplied to the drier 6 at 19. The evaporator 3 is vented to atmosphere at 21 through a scrubber 22. A mixture of potassium dihydrogen phosphate and dilute phosphoric acid is fed at 23 from the wash secton 2B to the reactor 1.

Flow sheet 2 illustrates the alternative of hydrochlorice acid in the process. Phosphate rock fed at 25 is digested in reaction vessels 1A with hydrochloric acid solution from the absorber 15A fed at 16A. The resulting phosphoric acid is converted to insoluble dicalcium phosphate in reactor 1B by the addition at 26 of the remainder of the phosphate required in the reaction and limestone from a feeder 27 entering reactor 1C at 28. The solids are separated on a filter 29 and washed free of chloride. They are then reacted in the reactor 1 with an acid solution of potassium sulphate from the sulphate converter 9 and recycled liquor containing phosphoric acid from the separator washer 5. A portion of the phosphate rock is fed at 30 directly to the reactor 1. Waste calcium chloride leaves the filter 29 at 31.

Flow sheet 3 illustrates a further alternative, using an organic solvent miscible with water. Potassium dihydrogen phosphate is precipitated in the precipitator 4A by the addition at 33 from a feeder organic liquid 34. The resulting suspension is fed to the separator and washer 5. The crystals are separated and dried and are then in a saleable form. The mother liquor containing water, phosphoric acid, residual potassium phosphate and organic precipitant is fed to a distillation column 35 where the organic liquid is recovered and the phosphoric acid and potassium phosphate separated can be sent back to the process as shown at 36 or used for the manufacture of pure phosphates. The feeder 34 is replenished from a supply 32.

Flow sheet 4 shows the use of the organic solvent in an embodiment according to flow sheet 1.

I claim:

1. A process for the production of potassium dihydrogen phosphate comprising the steps of reacting phosphate rock with an aqueous reaction medium containing potassium bisulphate, sulphuric acid and phosphoric acid to form a liquid reaction mixture containing potassium dihydrogen phosphate product; separating calcium sulphate therefrom to obtain an aqueous solution of potassium dihydrogen phosphate and phosphoric acid; thereafter precipitating solid potassium dihydrogen phosphate from said aqueous solution thereof; recovering said solid potassium dihydrogen phosphate from said aqueous solution; and recycling a portion of the remaining aqueous solution of potassium dihydrogen phosphate and phosphoric acid solution to constitute part of said reaction medium.

2. A process according to claim 1 comprising the further step of producing the potassium bisulphate and sulphuric acid component of said reaction medium by reaction between potassium chloride and sulphuric acid, hydrochloric acid being formed as a by-product of the potassium chloride-sulphuric acid reaction.

3. A process according to claim 2 and further comprising the steps of recovering said hydrochloric acid as an aqueous solution, reacting said aqueous hydrochloric acid solution with phosphate rock to form a reaction mixture comprising phosphoric acid, calcium phosphate and calcium chloride; reacting said phosphoric acid, calcium phosphate and calcium chloride reaction mixture with further phosphate rock to form a suspension containing precipitated dicalcium phosphate; reacting said suspension with an alkaline material to form a slurry containing insoluble dicalcium phosphate suspended in a calcium chloride solution; freeing said slurry of said calcium chloride; and feeding the resulting recovered dicalcium phosphate to the reaction mixture produced by the reaction of phosphate rock with said reaction medium.

4. A process according to claim 3 wherein said alkaline material is selected from the group consisting of limestone, lime and aqueous calcium hydroxide.

5. A process for the production of potassium dihydrogen phosphate comprising the steps of reacting phosphate rock with a medium containing potassium bisulphate, sulphuric acid and phosphoric acid to form a reaction mixture containing potassium dihydrogen phosphate product; separating calcium sulphate from said reaction mixture to obtain an aqueous solution of potassium dihydrogen phosphate and phosphoric acid; precipitating solid potassium dihydrogen phosphate from said aqueous solution by the addition thereto of a water miscible organic solvent to form a suspension of solid potassium dihydrogen phosphate in a mother liquor containing phosphoric acid, potassium dihydrogen phosphate and organic solvent; recovering solid potassium dihydrogen phosphate from said suspension; distilling organic solvent from said mother liquor, recycling the recovered organic solvent to the precipitation stage of said potassium dihydrogen phosphate; and recycling the remaining solution of potassium dihydrogen phosphate and phosphoric acid from the distillation stage for said organic solvent to said reaction mixture as the phosphoric acid component of said reaction medium.

6. A process according to claim 5 and further comprising the steps of obtaining said potassium bisulphate and sulphuric acid components of said reaction medium by reaction of potassium chloride and sulphuric acid in a sulphate conversion stage, hydrochloric acid being obtained as a by-product; forming a hydrochloric acid solution from said hydrochloric acid by-product of said sulphate conversion stage; feeding said hydrochloric acid solution together with phosphate rock to a first reaction stage to form a mixture containing phosphoric acid, calcium phosphate and calcium chloride; feeding said mixture together with further phosphate rock to a second reaction stage to form a suspension of precipitated dicalcium phosphate in admixture with phosphoric acid and calcium chloride; feeding said suspension to a third reaction stage together with an alkaline material to form a slurry containing insoluble dicalcium phosphate in suspension, in aqueous phosphoric acid and calcium chloride; separating said calcium chloride from said slurry; and feeding the recovered dicalcium phosphate suspension to said reaction mixture containing phosphate rock and said reaction medium.

7. A process according to claim 1 and further defined wherein said solid potassium dihydrogen phosphate is precipitated from said aqueous solution by the addition thereto of a water miscible organic solvent to form a suspension of solid potassium dihydrogen phosphate in a mother liquor containing phosphoric acid, potassium dihydrogen phosphate and organic solvent.

8. A process according to claim 7 and comprising the further steps of distilling organic solvent from said mother liquor, recycling the recovered organic solvent to the precipitation stage of said potassium dihydrogen phosphate; and recycling the remaining solution of potassium dihydrogen phosphate and phosphoric acid from the distillation stage for said organic solvent to said reaction mixture as the phosphoric acid component of said reaction medium.

9. A process according to claim 8 and further comprising the steps of obtaining said potassium bisulphate and sulphuric acid components of said reaction medium by reaction of potassium chloride and sulphuric acid in a sulphate conversion stage, hydrochloric acid being obtained as a by-product.

10. A process according to claim 9 and further comprising the steps of forming a hydrochloric acid solution from said hydrochloric acid by-product of said sulphate conversion stage; feeding said hydrochloric acid solution together with phosphate rock to a first reaction stage to form a mixture containing phosphoric acid, calcium phosphate and calcium chloride, feeding said mixture together with further phosphate rock to a second reaction stage to form a suspension of precipitated dicalcium phosphate in admixture with phosphoric acid and calcium chloride; feeding said suspension to a third reaction stage together with an alkaline material to form a slurry containing insoluble dicalcium phosphate in suspension, in aqueous phosphoric acid and calcium chloride separating said calcium chloride from said slurry; and feeding the recovered dicalcium phosphate suspension to said reaction mixture containing phosphate rock and said reaction medium.

11. A process according to claim 10 wherein said alkaline material is selected from the group consisting of limestone, lime and aqueous calcium hydroxide.

* * * * *